US011144986B2

United States Patent
Manggala

(10) Patent No.: US 11,144,986 B2
(45) Date of Patent: Oct. 12, 2021

(54) THEME RECOMMENDATION ENGINE

(71) Applicant: Shopify Inc., Ottawa (CA)

(72) Inventor: Putra Manggala, Montreal (CA)

(73) Assignee: Shopify Inc., Ottawa (CA)

( * ) Notice: Subject to any disclaimer, the term of this patent is extended or adjusted under 35 U.S.C. 154(b) by 1 day.

(21) Appl. No.: 16/527,128

(22) Filed: Jul. 31, 2019

(65) Prior Publication Data
US 2021/0034682 A1 Feb. 4, 2021

(51) Int. Cl.
G06Q 30/06 (2012.01)
G06T 11/60 (2006.01)
G06F 3/0484 (2013.01)
G06F 3/048 (2013.01)

(52) U.S. Cl.
CPC .......... *G06Q 30/0641* (2013.01); *G06T 11/60* (2013.01); *G06F 3/048* (2013.01); *G06F 3/0484* (2013.01); *G06F 3/04842* (2013.01)

(58) Field of Classification Search
CPC ..... G06Q 30/0641; G06T 11/60; G06F 3/048; G06F 3/0484; G06F 3/04842
See application file for complete search history.

(56) References Cited

U.S. PATENT DOCUMENTS

| 9,329,762 | B1 |   | 5/2016  | Schultz et al. |            |
|-----------|----|---|---------|----------------|------------|
| 9,338,242 | B1 | * | 5/2016  | Suchland       | G06Q 30/02 |
| 9,659,310 | B1 | * | 5/2017  | Allen          | G06Q 30/0254 |
| 10,003,780 | B1 | * | 6/2018 | Pontual        | H04N 5/775 |
| 2009/0208118 | A1 | * | 8/2009 | Csurka      | H04N 1/3873 |
|           |    |   |         |                | 382/228    |
| 2010/0169340 | A1 | * | 7/2010 | Kenedy       | G06Q 30/02 |
|           |    |   |         |                | 707/758    |
| 2010/0313141 | A1 | * | 12/2010 | Yu          | G06Q 30/02 |
|           |    |   |         |                | 715/747    |
| 2011/0016001 | A1 | * | 1/2011 | Schieffelin  | A61B 5/0059 |
|           |    |   |         |                | 705/14.66  |
| 2011/0029561 | A1 | * | 2/2011 | Slaney       | G06F 16/583 |
| 2012/0284245 | A1 | * | 11/2012 | Portnoy     | G06Q 30/02 |
|           |    |   |         |                | 707/706    |
| 2013/0124449 | A1 | * | 5/2013 | Pinckney     | G06N 5/048 |
|           |    |   |         |                | 706/52     |

(Continued)

*Primary Examiner* — Nicholas Klicos
(74) *Attorney, Agent, or Firm* — GTC Law Group PC & Affiliates

(57) ABSTRACT

A computer-implemented method and system may include identifying, by a recommendation engine, a first plurality of images in a first theme that includes a first layout characteristic, determining a first plurality of vector representations of the first plurality of images using an image processing model that includes a layered matrix of nodes with weighted interconnections, identifying at least a second plurality of images in a second theme that includes a second layout characteristic that is different from the first layout characteristic, determining a second plurality of vector representations of the second plurality of images, computing a vector difference between the first plurality of vector representations and the second plurality of vector representations; determining and communicating a recommendation based on the computed vector difference, and mapping received feedback to the weightings of the interconnections to improve a future recommendation.

27 Claims, 4 Drawing Sheets

(56) References Cited

U.S. PATENT DOCUMENTS

| | | | |
|---|---|---|---|
| 2014/0244562 A1* | 8/2014 | Wilson | G06Q 30/02 |
| | | | 706/46 |
| 2015/0019943 A1* | 1/2015 | Ying | G06F 40/106 |
| | | | 715/204 |
| 2015/0086116 A1 | 3/2015 | Yamaji | |
| 2016/0078507 A1* | 3/2016 | Shivaswamy | G06Q 30/0605 |
| | | | 705/26.2 |
| 2016/0267087 A1* | 9/2016 | Mowatt | G06F 16/24578 |
| 2016/0284007 A1* | 9/2016 | Sakai | G06F 16/24578 |
| 2018/0040044 A1* | 2/2018 | Mattingly | G06T 7/70 |
| 2018/0150436 A2* | 5/2018 | Ben-Aharon | G06F 40/186 |

* cited by examiner

E-Commerce Platform

Q Search

⌂ Home
↪ Orders
◇ Products
○ Customers
⊞ Reports
⊛ Discounts
⊞ Apps

SALES CHANNELS ⊕
🏬 Online Store ◈
📱 Mobile App
View all channels (652)

Good afternoon, Jonny B..
Here's what's happening with your store today.

Today's total sales    Today's visits
$98.00                 1

● Update your Platform Payments tax details
  We require additional information to verify your identity.
  [Update tax details]

● Advanced Cash on Delivery has been deactivated for your store
  [See why]

⚙ Settings (JG) John's Apparel
     Jonny B. Good

[All channels ▾]    [Today ▾]

TOTAL SALES                         Jun 1
$98.00                              2 orders
$125
$75
$25
 12am    4am    8am    4pm    11pm TOTAL SALES BY CHANNEL              Jun 1
                         View dashboard
Online Store                        0 orders
$0.00

Mobile App                          0 orders
$0.00

Shopify POS (126 York St.)          0 orders
$0.00

FIG. 2

THEME RECOMMENDATION ENGINE

FIELD

The present disclosure relates generally to e-commerce, and more specifically to recommendations to users of an e-commerce platform in relation to images and themes.

BACKGROUND

Online stores hosted through an e-commerce platform are often presented through the use of thematic templates for display of content. When a user is considering a theme for use, such as for the first time or when considering a change to a new theme, an e-commerce platform may provide recommendations, such as based on themes being used by or viewed by other similar users. However, basing a recommendation on what others are doing does not consider a user's personal preferences. Further, users may not even be aware of what preferences they have as related to web content presentation. As a result, traditional recommendation methods may not prove useful to users, forcing them to sort through a potentially large number of themes in hopes of finding the one that appeals to them.

SUMMARY

In an aspect, a method may include identifying, by a recommendation engine, at least a first image; determining a first vector representation of the first image using an image processing model, wherein the image processing model has been trained at least in part on images used in relation to e-commerce; identifying, by the recommendation engine, at least a second image related to a candidate e-commerce recommendation; determining a second vector representation of the second image using the image processing model; computing a first vector difference between the first vector representation and the second vector representation; and determining an e-commerce recommendation based on the computed first vector difference. In embodiments, the first image may be identified at least in part by an affinity score. The recommendation engine may determine if the affinity score is above a threshold value. The second image may be at least in part identified by the first vector representation. The first image may be used in relation to e-commerce. Further process steps may include identifying, by a recommendation engine, a third image related to a candidate e-commerce recommendation; determining a third vector representation of the third image using the image processing model; computing a second vector difference between the first vector representation and the third vector representation; comparing the first vector difference and the second vector difference; and communicating an e-commerce recommendation based on the comparing of the vector difference and the second vector difference. The image processing model may utilize at least one of a semantic hash, deep neural network, or convolutional neural network. Vector representations of images may be determined by the image processing model to include an identification of a relevant image characteristic. The identified relevant image characteristic may be used to categorize a plurality of images, where the categories may be used in the identifying of the second image. The first image may be identified based on a user action. The user action may be a selection of the first image. The user action may be a selection of an e-commerce theme in which the first image is included. The user action may be an image preference indication. The first image may be used by a second user of the e-commerce platform that has a characteristic similarity to a first user. The first image may be selected from an online store of the second user, and the characteristic similarity may be a similarity between a topical interest of the first user and a topical interest of the online store of the second user. The first image may be selected from an e-commerce theme of the second user, and the characteristic similarity may be a similarity between an e-commerce theme selected by the first user and the e-commerce theme of the second user. The first user may be a merchant on the e-commerce platform. The first user may be an online store developer on the e-commerce platform. The first image may be identified based on an input received from a merchant device. The input may be a selection of the first image. The input may be a selection of an e-commerce theme in which the first image is included. The input may be an image preference indication. The second image may be from a candidate theme. The second image may be from a stored plurality of images. The stored plurality of images may include images associated with themes. The vector difference may be computed based on differences between individual vector representation elements. The vector representation elements may be one of a layer, feature, or node of the vector representation. The vector difference may include a weighting of vector representation elements based on a user preference. The user preference may be provided by the user. The user preference may be determined from a user action. The user action may be a selection or viewing of a theme. The user action may be a selection or viewing of an image. The user preference may be provided by an input from a merchant device. The user preference may be determined from the input. The input may be a selection or viewing of a theme. The input may be a selection or viewing of an image.

In an aspect, a system may include an e-commerce recommendation engine configured to store a set of instructions that, when executed, cause the e-commerce recommendation engine to identify, by a recommendation engine, at least a first image; determine a first vector representation of the first image using an image processing model, wherein the image processing model has been trained at least in part on images used in relation to e-commerce; identify, by the recommendation engine, at least a second image related to a candidate e-commerce recommendation, wherein identifying the second image is at least in part determined by the first vector representation; determine a second vector representation of the second image using the image processing model; compute a vector difference between the first vector representation and the second vector representation; and determine an e-commerce recommendation based on the computed vector difference. In embodiments, the first image may be identified at least in part by an affinity score. The recommendation engine may determine if the affinity score is above a threshold value. The second image may be at least in part identified by the first vector representation. The first image may be used in relation to e-commerce. Further process steps may include identifying, by a recommendation engine, a third image related to a candidate e-commerce recommendation; determining a third vector representation of the third image using the image processing model; computing a second vector difference between the first vector representation and the third vector representation; comparing the first vector difference and the second vector difference; and communicating an e-commerce recommendation based on the comparing of the vector difference and the second vector difference. The image processing model may utilize at least one of a semantic hash, deep neural network, or convolutional neural network. Vector representations of images may be determined by the image processing model to include an identification of a relevant image characteristic. The identified relevant image characteristic may be used to categorize a plurality of images, where the categories may be used in the identifying of the second image. The first image may be identified based on a user action. The user action may be a selection of the first image. The user action may be a selection of an e-commerce theme in which the first image is included. The user action may be an image preference indication. The first image may be used by a second user of the e-commerce platform that has a characteristic similarity to a first user. The first image may be selected from an online store of the second user, and the characteristic similarity may be a similarity between a topical interest of the first user and a topical interest of the online store of the second user. The first image may be selected from an e-commerce theme of the second user, and the characteristic similarity may be a similarity between an e-commerce theme selected by the first user and the e-commerce theme of the second user. The first user may be a merchant on the e-commerce platform. The first user may be an online store developer on the e-commerce platform. The first image may be identified based on an input received from a merchant device. The input may be a selection of the first image. The input may be a selection of an e-commerce theme in which the first image is included. The input may be an image preference indication. The second image may be from a candidate theme. The second image may be from a stored plurality of images. The stored plurality of images may include images associated with themes. The vector difference may be computed based on differences between individual vector representation elements. The vector representation elements may be one of a layer, feature, or node of the vector representation. The vector difference may include a weighting of vector representation elements based on a user preference. The user preference may be provided by the user. The user preference may be determined from a user action. The user action may be a selection or viewing of a theme. The user action may be a selection or viewing of an image. The user preference may be provided by an input from a merchant device. The user preference may be determined from the input. The input may be a selection or viewing of a theme. The input may be a selection or viewing of an image.

BRIEF DESCRIPTION OF THE FIGURES

FIG. 2 depicts an embodiment of a home page of an administrator.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
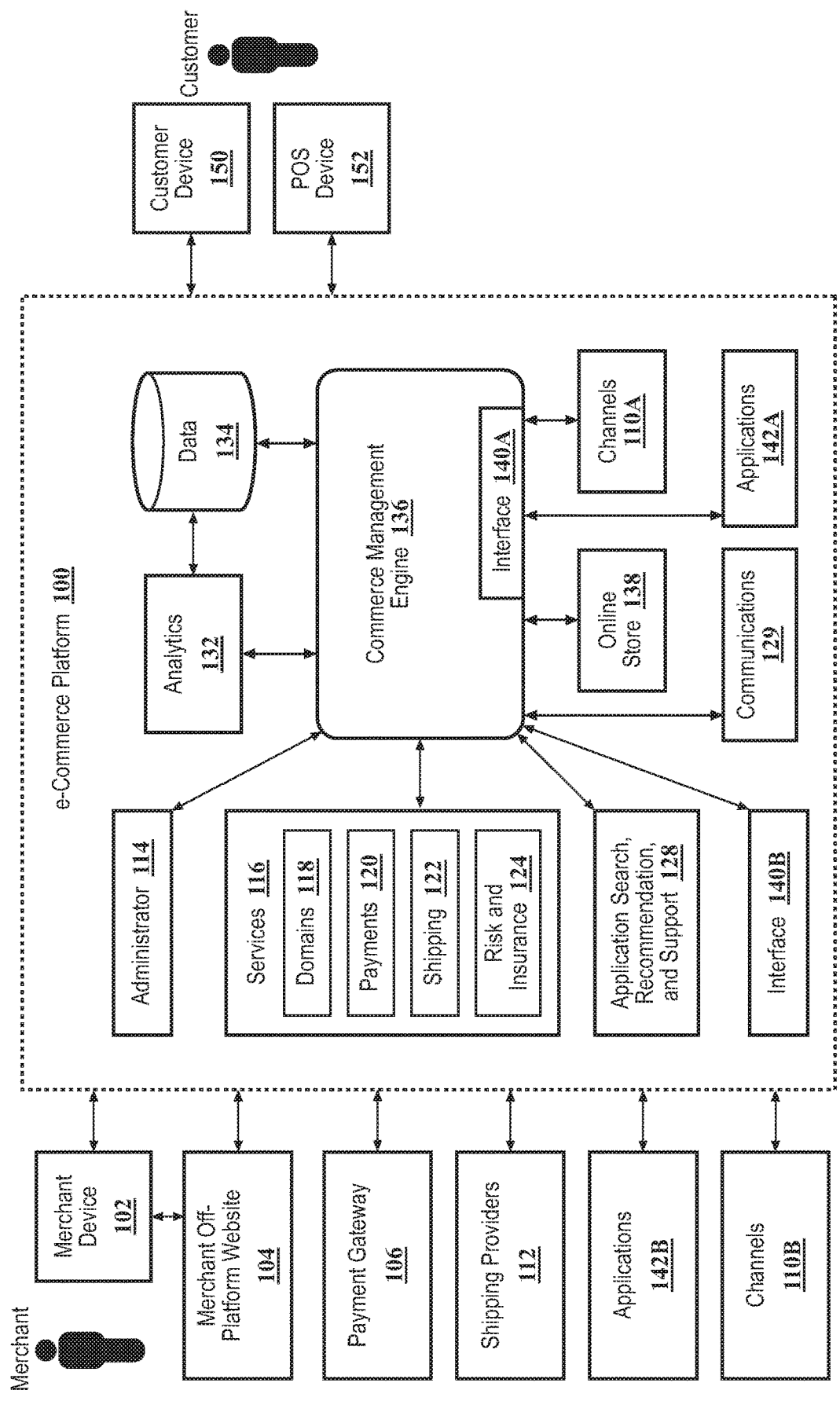
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide merchants or developers, or more generally users, with support for presenting the content of the user's online store 138, such as through a selection of a theme for use with the online store 138 from a plurality of available themes. To aid the user in selecting a theme for use (e.g., when a user is first selecting a theme for the online store 138 or when considering a change of theme) the e-commerce platform 100 may provide the user with recommendations. For instance, a recommendation may be based on themes employed by other similar users (e.g., merchants selling similar products to a similar demographic), based on a user's specified preferences (e.g., the user prefers bright vs. subdued colors for web-based content presentation), and the like. Recommendations may aid the user in selecting a theme from a large number of available choices. In embodiments, recommendations may relate to particular images or visuals, as opposed to entire themes.

Figure 3:
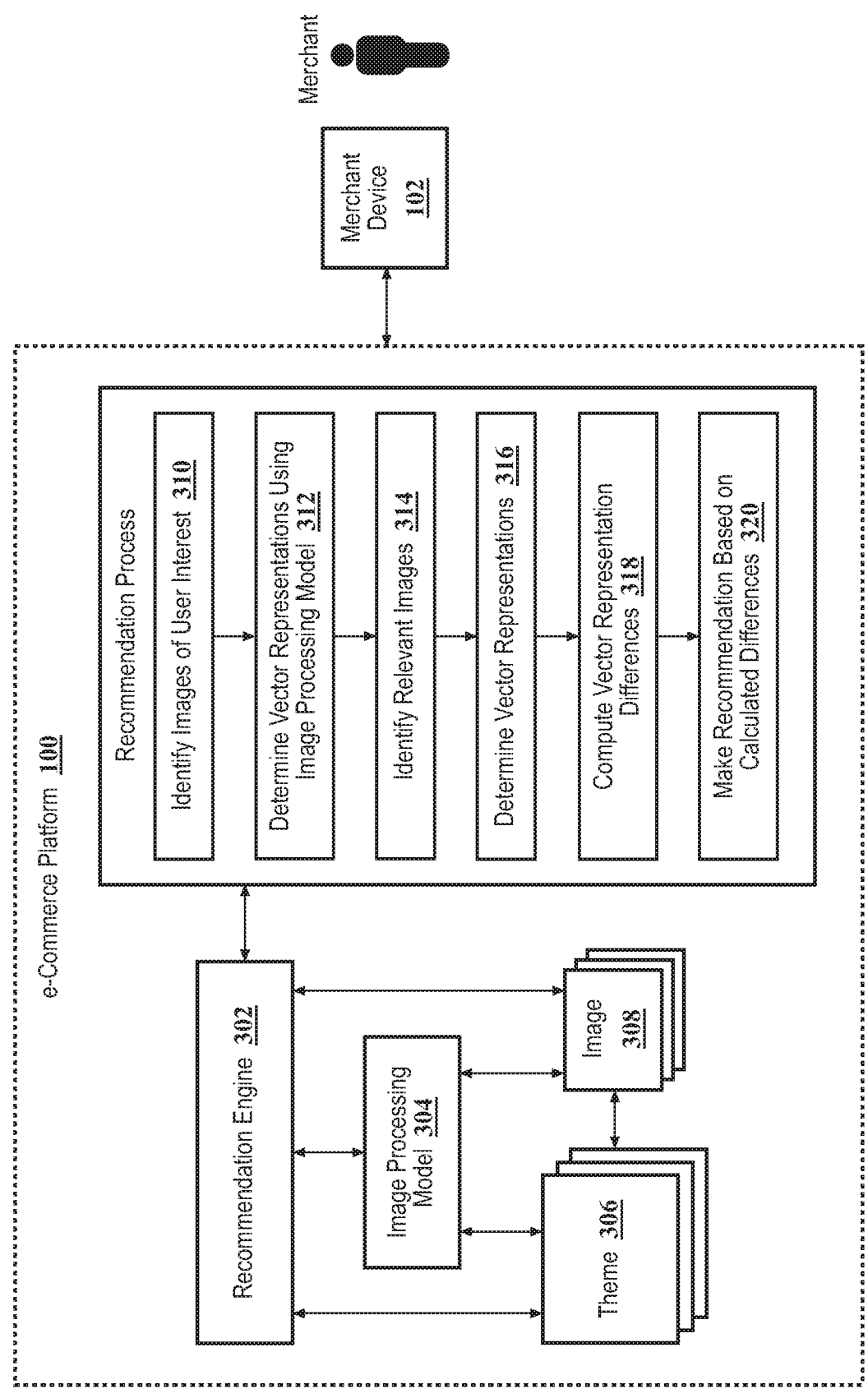
FIG. 3 depicts an embodiment functional block diagram for an e-commerce platform with a theme recommendation engine.

Referring to FIG. 3, in embodiments a recommendation engine 302 may provide recommendations to a user based on the content of images (e.g., based on the aesthetic features of images) a user has viewed, where the content of the images is identified at least in part through an image processing model 304, such a utilizing semantic hash, deep neural networks, convolutional neural networks, and the like, for generating vector representations of the images. A vector representation may be generated by normalizing the image data and metadata into matrix representation of the content image. For example, a recommendation engine 302 may utilize the image processing model 304 to identify the content of the images 308 in a theme 306 viewed by a user, such as images in an active theme on the user's online store or in themes that the user has indicated are of interest (e.g., while the user is reviewing a library of themes). The recommendation engine 302 may then recommend other images and themes based on the evaluated image content of those viewed by the user. In embodiments, the image processing model 304 may process the content of images to include image data, metadata of the image (e.g., category, type, and/or image name), and the like. For instance, the image processing model 304 may perform a metadata analysis on the content of images, such as in the classification of the image, generating the vector representation, and the like. In embodiments, a metadata analysis may be used as an input to the image processing model as part of the generating of the vector representation. In embodiments, the image processing model 304 may utilize an interpolation model (e.g., linear, polynomial, and the like) in the processing of image data, such as part of the image processing model, as an input to the image processing model, as applied to the output of the image processing model, and the like, such as to modify an image for processing by the image processing model (e.g., conforming image size for the model), processing the output of the image processing model (e.g., categorizing the outputs of the model), and the like.

The recommendation engine 302 may provide for a recommendation process including identifying an image or set of images, such as images of interest. Images may be from a theme the user has selected or images from the user's online store 138, may be images the user has indicated (directly or indirectly) to be of interest (e.g., that they have 'liked' or viewed for a certain period of time), may be a set of images associated with successful, similar shops, or from any other source. In embodiments, the image may be identified based on a user action, such as where the user action is a selection of the image by the user, a selection of an e-commerce theme in which the image is included, an image preference indication by the user or the like. The image may be used by a second user of the e-commerce platform that has a characteristic similarity to the user, such as where the image is selected from an online store 138 of the second user and the characteristic similarity is a similarity between a topical interest of the user and a topical interest of the online store of the second user, where the image is selected from an e-commerce theme of the second user and the characteristic similarity is a similarity between an e-commerce theme selected by the user and the e-commerce theme of the second user. In embodiments, the user may be a merchant on the e-commerce platform, an online store developer on the e-commerce platform, and the like.

The recommendation engine 302 may determine the vector representation for this image or set of images using the image processing model 304 (e.g., generating a vector file based on the image or set of images). The image processing model 304 may generate the vector representations as machine-readable and/or numerical representations that can be compared to other vector representations, such as for identifying similarities or differences between elements of different vector representations (e.g., features of different images for which the image processing model has generated vector representations). For instance, the recommendation engine 302 may start with a plurality of images and create a vector representation for each image and store the resulting vector representation into a vector file. In embodiments, in addition to storing the vector representation (e.g., potentially containing a large number of values), the vector file may also include metadata such as an image name, a class for the image, and the like. The vector representations for the plurality of images may then be used in computational tasks, such as for comparing, classifying, clustering, interpolation modeling, metadata analysis, and the like.

In embodiments, the vector representation may be stored as a separate file from the associated image, a separate file for a group of images, associated with, attached to or incorporated into the image file as metadata, and the like. The recommendation engine 302 may identify another image or set of images of interest as a recommendation candidate(s), which may be images that a user is considering using or images that are candidates for recommending to a user. The recommendation engine 302 may determine the vector representation for this recommendation candidate image or set of images using the image processing model 304. The recommendation engine 302 may compute the difference or distance between the vector representations or elements of the vector representations (e.g., individual elements within the vector representation, groups of elements of the vector representation, and the like, such as a layer, feature, or node of the vector representation), which may be a simple calculation on a node by node (or value by value) basis or may be a more complicated cross-node (or cross-value) calculation, where in embodiments the more computationally inexpensive calculations and approaches may be favored. In embodiments, nodes (or values) may be weighted in this calculation (e.g., such as for personalization) or equally weighted if there is no preference among nodes. This process may be repeated across other recommendation candidates. In embodiments, recommendations may be based on the vector differences to recommend certain images or sets of images and exclude others.

Referring to FIG. 3, in an embodiment recommendation process, in a step 310 the recommendation engine may identify images of interest to the user (e.g., images the user has viewed on the e-commerce platform). In a step 312 the recommendation engine may utilize the image processing model to determine vector representations of the images of interest to the user. In a step 314 the recommendation engine may identify relevant images of the images, such as where relevant images are images of interest to the user (e.g., through evaluating the vector representation of the images of interest and comparing them to vector representations of other images available to the recommendation engine). For instance, the recommendation engine 302 may have characterized or pre-processed vector representations for a plurality of images related to e-commerce (e.g., available through the e-commerce platform 100) and categorized and stored them so that the images of interest to the user can be readily compared to determine relevancy (e.g., similar in aesthetic features). In embodiments, the recommendation engine 302 may provide a relational factor between images, such as to compare to an affinity score for a particular user (e.g., user selection and interactions used to generate the affinity score) where the recommendation engine 302 may then determine if the affinity score is above a threshold value (e.g., where the level is set by the recommendation engine or by the user). In a step 316 the recommendation engine may determine the vector representations for the relevant images (e.g., utilizing the image processing model 304 to generate vector representations, retrieving pre-calculated vector representations, and the like). In a step 318 the recommendation engine may then make comparisons (e.g., determine differences) between the vector representations of the images of interest to the user and vector representations of the relevant images. In a step 320 the recommendation engine may then use these comparisons to make a recommendation to the user, such as recommending a new theme that the user may like based on the types of images the user prefers, recommending a new image for use in a theme that the user may like based on types of images the user prefers, and the like.

For example, a user may be a merchant with an online store 138 on the e-commerce platform 100, where the merchant has populated the online store over time with a plurality of images 308 associated with the marketing and sale of products provided by the merchant. But the merchant is now looking to change to a new theme 306 and begins to sort through and review different new themes available to them, including the viewing of the plurality of images 308 associated with the themes 306. In this use case, the merchant may be selecting themes for further review based on a representative home page that includes at least one representative image for illustrating how the theme will present to a customer. For instance, the theme's home page may show a large web banner or product image prominently placed on the page (e.g., a hero image), a low-key image of person smiling, a landscape background with text in the foreground, and the like. In this instance, let us say that that the user is drawn to themes displaying a boldly colored hero image. During the process of the user sorting through the themes, the recommendation engine 302 may be at least in part executing a recommendation process, such as monitoring the images the user is viewing, using the image processing model 304 to generate vector representations of the images, selecting relevant images, using the image processing model 304 to generate vector representations of the relevant images, computing vector representation differences between the images the merchant is viewing the relevant images, and the like. As a result, while the user continues to sort through the themes for one they want to select, the recommendation engine sends the merchant a recommendation for one or more themes they may like, where the recommendation is based on differences in the vector representations of the viewed images by the user and the selected images by the recommendation engine 302. In this instance, the recommendation may be for other themes that feature boldly colored hero images. Additionally, the recommendation engine 302 may factor in the images the merchant is currently using in the online store (e.g., for similarities and differences between the images on the existing online store and the images the merchant is currently viewing), images the user has viewed while viewing other online stores (e.g., images associated with online stores the merchant is drawn to), image and/or theme preferences that the merchant has provided (e.g., in a merchant profile where the merchant describes the goals, products, and customer base of the online store as well as personal preferences for reaching target audiences), and the like.

In embodiments, use of the image processing model 304 to generate vector representations may greatly reduce the time it takes to compare the images, as the complexity resides in the building of the model and image processing (e.g., through semantic hashing) that can be done in advance (not as part of a live recommendation process). For example, a vector representation can be computed for each image (e.g., including images in the themes that the user is reviewing) in advance and stored with the image (e.g., as metadata, in the image file, in a separate database, and the like). After the model has been created, the computations remaining for a live recommendation process may be limited to the difference calculations between vector representations, which may involve computationally inexpensive calculations.

Training the image processing model 304 may utilize a diverse sample of e-commerce-related images selected from across the e-commerce platform 100, where the sample may be created by a human, machine or computer, or in combination. Analytic techniques such as a semantic hash, a convolutional neural network, and/or related techniques may be used to identify relevant characteristics of layers, features, and nodes of the vector representation, such as for categorization of images. For instance, a vector representation may be determined for an image by the image processing model 304 that includes the identification of a relevant image characteristic(s) (e.g., a color, shape, feature, characteristic, and the like, of the image). For e-commerce, these techniques may include assessment of background obstructions (e.g., images without background obstructions may be favored); how 'busy' the image is (e.g., less busy images may be favored); layout of the image (e.g., images with half open, clean, or uncluttered space and half with a large solid, geometric object may be favored so that a product, service or message can be featured in the open space); suitability for display of a particular type of image such as a hero image that features a large scale picture of the product, service or message; number of panels and/or slots in the image (e.g., images with three slots may be favored to allow featuring a main product, service, or message in the middle slot with the adjacent slots featuring supporting or otherwise related information, products or services); and the like. Categorizations or subsets of images may be determined that focus on a particular property of interest (e.g., backgrounds, layout, type, and the like), such as by running the analytic technique (e.g., semantic hash, convolutional neural network and related techniques) to produce a vector representation for each image. Then trends in the vector representations may be analyzed to identify the values common among the images, which maps to the elements (e.g., layers, features, and the like) of interest for the property of interest in the category of images, to the nodes of the vector representation covering the property of interest, and the like. In embodiments, this may be done for more than one property at a time, may concatenate different nodes of interest from different vector representations together, and the like. In embodiments, using the image processing model 304 may determine a vector of interest for any given image and determine average vector values for sets of images by averaging corresponding nodes for layers and features.

In embodiments, the image processing model 304 may comprise a layered matrix of nodes where nodes and layers of nodes are interconnected to other layers and nodes, such as in a previous layer, next layer, or any other layer in the matrix. These interconnections may be assigned a strength or weight as part of the modeled representation. Weights may be assigned during training, such as part of an iterative process of model learning. For instance, weights may be assigned to a model representation for a group of images, such as hero images, that determine the essential characteristics of hero images. In this way, nodes may represent the characteristic factors for a model and the weights represent the relative strength of those factors. For instance, a model for a general category of hero images (e.g., an individual)

may have a similar structure of layered nodes to that of a model for a specific hero image (e.g., an individual wearing active clothing in a nature setting) but the weights would be different in the model for the specific hero image to emphasize some features (increasing the weight) and deemphasizing others (decreasing the weight) that are characteristics of the sub-category.

In embodiments, the recommendation engine 302 may provide the ability to provide an explanation for a particular recommendation, such as providing for interpretability, e.g. where the nodes (or values) of the vectors are mapped to features and/or layers which can be mapped to preferences for a user (e.g., by checking the weights). For example, the recommendation engine 302 may indicate to the user that "we notice you prefer tri-panel display of products to hero images", or "we notice you favor the color green", or "we notice you favor higher resolution images over lower resolution ones", or "we notice you prefer images of people in athletic activities next to images of products", or "we notice you prefer separating images on a page with text blocks", or "we notice you favor banners at the top of a page but not at the bottom", or "we notice you prefer products to be on the right and setting images on the left", and the like. In embodiments, the recommendation engine 302 may adjust the weights in a model to accommodate a user preference. For instance, if a user prefers a specific type of hero image, the weights for a model representing a hero image may be altered to bias the model to better match the user preference for that specific type of hero image, such as where the weights are adjusted to strengthen the user's relative preferences (e.g., increasing the weights for preferred characteristics and/or decreasing the weights for non-preferred characteristics).

In embodiments, an explanation for a recommendation may be related to a distance characteristic, size characteristic, location characteristic, relational position characteristic, and the like, such as utilizing relational locations of images within a page (e.g., with respect to other images, text, or products), with respect to a boundary of the page (e.g., top, bottom, left side, or right side of the page), a distance from other objects on the page or from a boundary of the page, the size of an image or relative size of one image to another, and the like. In embodiments, distance characteristics may be determined with respect to vertical distance, index position distance (e.g., separation of an ordered sequence of items), position distance, distance from the edge of a page boundary (e.g., from the side, top, or bottom), and the like. In embodiments, a distance characteristic may be determined in absolute distance, relative distance, pixel distance (e.g., the number of pixels between the objects), and the like. For instance, "we notice you prefer images where the hero image of the product is within [X] distance of the edges of the screen" (e.g., where 'X' is in pixels or other distance measure), we notice you prefer a bold image near the center of the page", we notice you favor tri-panel displays where the panels are of equal size", and the like.

In embodiments, the recommendation engine 302 may be configured to use preferences to influence recommendations, such as where a user is able to configure or set preferences or where preferences may be derived by the recommendation engine 302 from information about the user. For instance, the preferences may map or may be used to set weightings of the nodes in the vectors which are taken into account in the computation of the difference or distance between vector representations. In embodiments, a preference may be that a user prefers a tri-panel display of products to hero images, favors the color green, favors higher resolution images over lower resolution ones, and the like. In embodiments, the user preference may be determined by the recommendation engine 302 from a user action, such as where the user action is a selection or viewing of a theme, a selection or viewing of an image, or a length of time during which a particular theme or image has been used or viewed, and the like.

In embodiments, the recommendation engine 302 may provide for a feedback loop to alter or improve recommendations, such as where the recommendation engine 302 examines what a merchant or other user does with the recommendations (e.g., did they accept a particular recommendation) to influence future recommendations, where this information may be mapped to the weightings of nodes as described herein. In an example, if a user accepts recommendations for tri-panel images, but rejects hero images, then this may be taken into account in the node weightings to favor tri-panel images over hero images.

Figure 4:
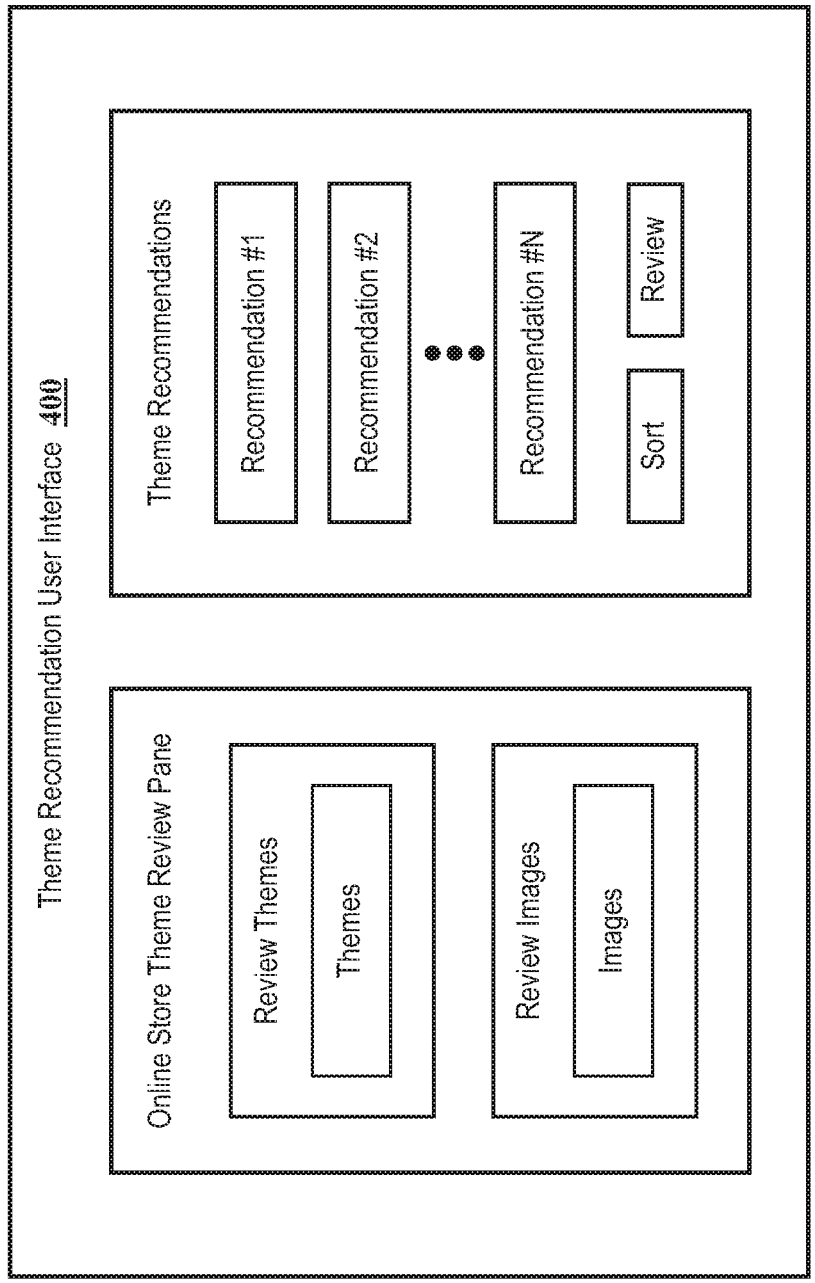
FIG. 4 depicts an embodiment for a user interface for a theme recommendation engine.

Referring to FIG. 4, in embodiments a user interface 400 may be provided by the e-commerce platform 100 for interfacing with the theme recommendation engine 302, such as for reviewing aspects of themes (e.g., themes, images, and the like) in preparation for selecting a theme or changing from an active theme to a new theme. For instance, a user may select and review themes for consideration, which the theme recommendation engine 302 may take into account as described herein in generating a theme recommendation. In an example, a user may maintain an online store 138 on the e-commerce platform 100 with an active theme but is using the user interface 400 to explore other themes, images, and the like, with the possibility of switching to a new theme. As the user reviews different themes and images the theme recommendation engine 302 may be monitoring related images, determining vector representations of the images, and comparing them with vector representations of other images as part of a potential theme recommendation. Continuing with this example, the user may receive one or more recommendations through the user interface 400, such as based on the user's review of themes. As such, the user may receive recommendations based at least in part on the user's activity, and thus be relevant to the preferences of the user (e.g., where the recommendations are for themes that reflect the user's current review session, past review sessions, explicit preferences, preferences of similar users, and the like).

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A method comprising:
    identifying, by a theme recommendation engine, at least a first plurality of images in a first theme comprising two or more images, wherein the first theme is being accessed from a library of themes by a computing device, the first theme being one of a plurality of themes accessible from the library of themes, each of the plurality of themes configured to present at least one of a product and service, wherein the first theme presents at least one image of the first plurality of images with a first layout characteristic;
    determining a first plurality of vector representations of the first plurality of images using an image processing model, wherein the image processing model has been trained at least in part on images used in relation to themes and comprises a layered matrix of nodes wherein nodes and layers of nodes are interconnected to other layers and nodes and wherein the interconnections are assigned a weight;
    identifying, by the theme recommendation engine, at least a second plurality of images in a second theme comprising two or more images, the second theme being one of the plurality of themes accessible from the library of themes, wherein the second theme presents at least one image of the second plurality of images with a second layout characteristic that is different from the first layout characteristic;

determining a second plurality of vector representations of the second plurality of images using the image processing model;

computing a first vector difference between the first plurality of vector representations and the second plurality of vector representations;

determining a recommendation based on the computed first vector difference;

communicating the recommendation to the computing device;

receiving feedback from the computing device that indicates whether the recommendation was accepted; and mapping the feedback to the weightings of the interconnections to improve a future recommendation.

2. The method of claim 1, wherein identifying the first plurality of images is determined at least in part by an affinity score.

3. The method of claim 2, wherein the theme recommendation engine determines if the affinity score is above a threshold value.

4. The method of claim 1, wherein identifying the second plurality of images is at least in part determined by the first plurality of vector representations.

5. The method of claim 1, further comprising:

identifying, by the theme recommendation engine, that the first theme is an active theme in an online store;

identifying, by the theme recommendation engine, a third plurality of images in a third theme comprising two or more images, the third theme being one of the plurality of themes accessible from the library of themes, wherein the third theme presents at least one image of the third plurality of images with a third layout characteristic that is different from the first layout characteristic and the second layout characteristic;

determining a third plurality of vector representations of the third plurality of images using the image processing model;

computing a second vector difference between the first plurality of vector representations and the third plurality of vector representations;

comparing the first vector difference and the second vector difference; and communicating the recommendation to the computing device based on the comparing of the first vector difference and the second vector difference and wherein the recommendation is related to switching the active theme from the first theme to one of the second theme and the third theme.

6. The method of claim 1, wherein an identified relevant image characteristic is used to categorize a plurality of images, wherein the categories are used in the identifying the second plurality of images.

7. The method of claim 1, further comprising:

communicating the recommendation while the first theme is being accessed by the computing device.

8. The method of claim 1, wherein the difference between the first layout characteristic and the second layout characteristic is a relational position characteristic.

9. The method of claim 1, wherein the difference between the first layout characteristic and the second layout characteristic is a location characteristic.

10. The method of claim 1, wherein the difference between the first layout characteristic and the second layout characteristic is at least one of a distance characteristic or a size characteristic.

11. The method of claim 1, wherein the feedback includes an acceptance of a first image and a rejection of a second image.

12. The method of claim 11, wherein the mapping of the feedback to the weightings includes adjusting the weights in the image processing model to accommodate a user preference for the first image relative to the second image.

13. The method of claim 12, wherein the first image and the second image differ in terms of at least one image characteristic selected from the group consisting of a background obstruction characteristic, a busyness characteristic, a layout characteristic, and a suitability for display characteristic.

14. The method of claim 13, wherein the feedback is received at a time when the theme recommendation engine is monitoring images being viewed on the computing device.

15. A system comprising:

a processor; and a theme recommendation engine configured to store a set of instructions that, when executed by the processor, cause the system to:

identify, by the theme recommendation engine, at least a first plurality of images in a first theme comprising two or more images, wherein the first theme is being accessed from a library of themes by a computing device, the first theme being one of a plurality of themes accessible from the library of themes, each of the plurality of themes configured to present at least one of a product and service, wherein the first theme presents at least one image of the first plurality of images with a first layout characteristic;

determine a first plurality of vector representations of the first plurality of images using an image processing model, wherein the image processing model has been trained at least in part on images used in relation to themes and comprises a layered matrix of nodes wherein nodes and layers of nodes are interconnected to other layers and nodes and wherein the interconnections are assigned a weight;

identify, by the theme recommendation engine, at least a second plurality of images in a second theme comprising two or more images, the second theme being one of the plurality of themes accessible from the library of themes, wherein the second theme presents at least one image of the second plurality of images with a second layout characteristic that is different from the first layout characteristic;

determine a second plurality of vector representations of the second plurality of images using the image processing model;

compute a first vector difference between the first plurality of vector representations and the second plurality of vector representations;

determine a recommendation based on the computed first vector difference;

communicate the recommendation to the computing device;

receive feedback from the computing device that indicates whether the recommendation was accepted; and map the feedback to the weightings of the interconnections to improve a future recommendation.

16. The system of claim 15, wherein the first plurality of images is identified at least in part by an affinity score.

17. The system of claim 16, wherein the theme recommendation engine determines if the affinity score is above a threshold value.

18. The system of claim 15, wherein the second plurality of images is identified at least in part by the first plurality of vector representations.

19. The system of claim 15, wherein the instructions, when executed by the processor, further cause the system to:
identify that the first theme is an active theme in an online store;
identify a third plurality of images in a third theme comprising two or more images, the third theme being one of the plurality of themes accessible from the library of themes, wherein the third theme presents at least one image of the third plurality of images with a third layout characteristic that is different from the first layout characteristic and the second layout characteristic;
determine a third plurality of vector representations of the third plurality of images using the image processing model;
compute a second vector difference between the first plurality of vector representations and the third plurality of vector representations;
compare the first vector difference and the second vector difference; and
communicate the recommendation to the computing device based on the comparing of the first vector difference and the second vector difference and wherein the recommendation is related to switching the active theme from the first theme to one of the second theme and the third theme.

20. The system of claim 15, wherein the instructions, when executed, further cause the system to:
communicate the recommendation while the first theme is being accessed by the computing device.

21. The system of claim 15, wherein the feedback includes an acceptance of a first image and a rejection of a second image.

22. The system of claim 21, wherein the mapping of the feedback to the weightings includes adjusting the weights in the image processing model to accommodate a user preference for the first image relative to the second image.

23. The system of claim 22, wherein the first image and the second image differ in terms of at least one image characteristic selected from the group consisting of a background obstruction characteristic, a busyness characteristic, a layout characteristic, and a suitability for display characteristic.

24. The system of claim 23, wherein the feedback is received at a time when the theme recommendation engine is monitoring images being viewed on the computing device.

25. A non-transitory computer-readable storage medium storing a set of instructions that, when executed by a processor of a computing device, cause the computing device to:
identify, by a theme recommendation engine, at least a first plurality of images in a first theme comprising two or more images, wherein the first theme is being accessed from a library of themes by the computing device, the first theme being one of a plurality of themes accessible from the library of themes, each of the plurality of themes configured to present at least one of a product and service, wherein the first theme presents at least one image of the first plurality of images with a first layout characteristic;
determine a first plurality of vector representations of the first plurality of images using an image processing model, wherein the image processing model has been trained at least in part on images used in relation to themes and comprises a layered matrix of nodes wherein nodes and layers of nodes are interconnected to other layers and nodes and wherein the interconnections are assigned a weight;
identify, by the theme recommendation engine, at least a second plurality of images in a second theme comprising two or more images, the second theme being one of the plurality of themes accessible from the library of themes, wherein the second theme presents at least one image of the second plurality of images with a second layout characteristic that is different from the first layout characteristic;
determine a second plurality of vector representations of the second plurality of images using the image processing model;
compute a first vector difference between the first plurality of vector representations and the second plurality of vector representations;
determine a recommendation based on the computed first vector difference;
communicate the recommendation to the computing device;
receive feedback from the computing device that indicates whether the recommendation was accepted; and
map the feedback to the weightings of the interconnections to improve a future recommendation.

26. The non-transitory computer-readable storage medium of claim 25, wherein the feedback includes an acceptance of a first image and a rejection of a second image.

27. The non-transitory computer-readable storage medium of claim 26, wherein the mapping of the feedback to the weightings includes adjusting the weights in the image processing model to accommodate a user preference for the first image relative to the second image.

\* \* \* \* \*